J. SCHULTZ.
MIXING VALVE.
APPLICATION FILED JUNE 6, 1913.

1,103,439.

Patented July 14, 1914.
2 SHEETS—SHEET 1.

WITNESSES
Walter P. Geyer.
W. Ray Taylor

INVENTOR
John Schultz,
by Geyer & Popp
ATTORNEYS.

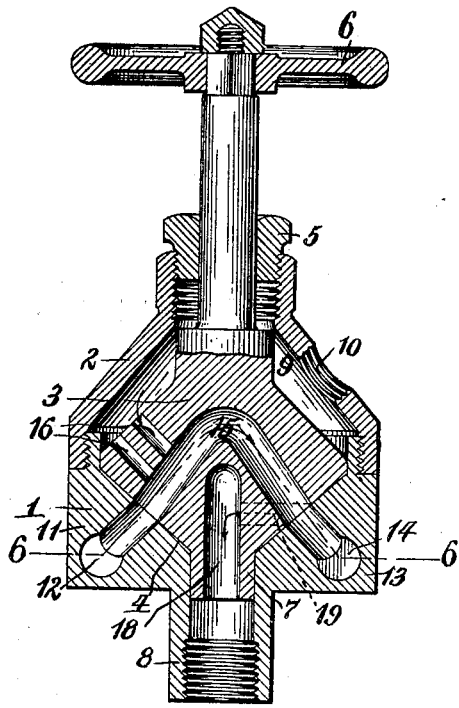
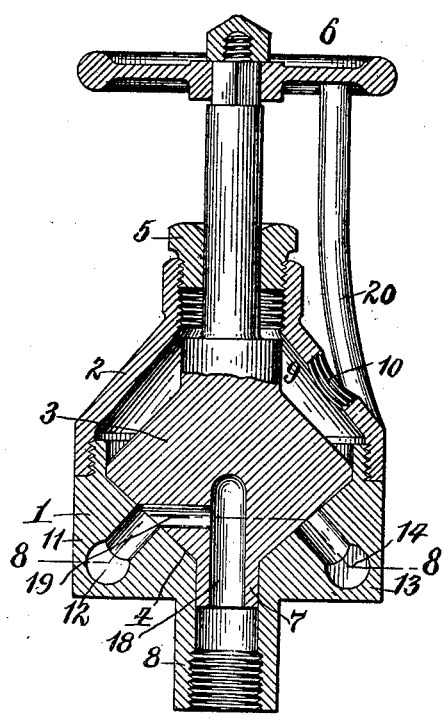
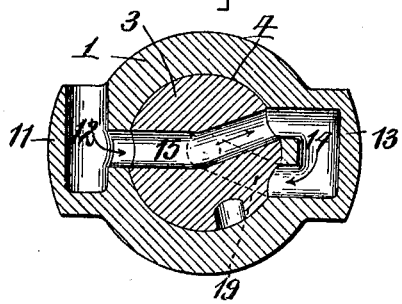
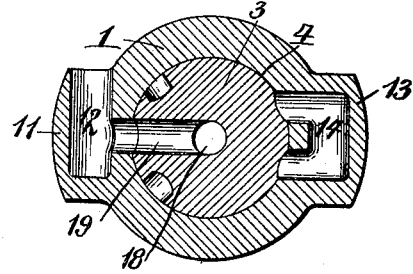

UNITED STATES PATENT OFFICE.

JOHN SCHULTZ, OF BUFFALO, NEW YORK.

MIXING-VALVE.

1,103,439.    Specification of Letters Patent.    Patented July 14, 1914.

Application filed June 6, 1913. Serial No. 772,124.

*To all whom it may concern:*

Be it known that I, JOHN SCHULTZ, a citizen of the United States, residing at Buffalo, in the county of Erie and State of New York, have invented new and useful Improvements in Mixing-Valves, of which the following is a specification.

This invention relates to the general class of valves capable of delivering either hot or cold water, and more particularly to a valve of this kind desirable in industrial plants where water is heated by high pressure steam, such as slaughter houses. Ordinarily the water is heated by admitting cold water and steam into the same outlet pipe, but this causes an annoying vibration or chatter of the pipes and valves which also produces leaks and breakage of the valve heads or disks.

One of the objects of my invention is the production of a tight and reliable valve of simple construction which overcomes such vibration and its injurious consequences.

A further object is the provision of a convenient valve that will deliver cold water, hot water or steam as desired.

Figure 1:
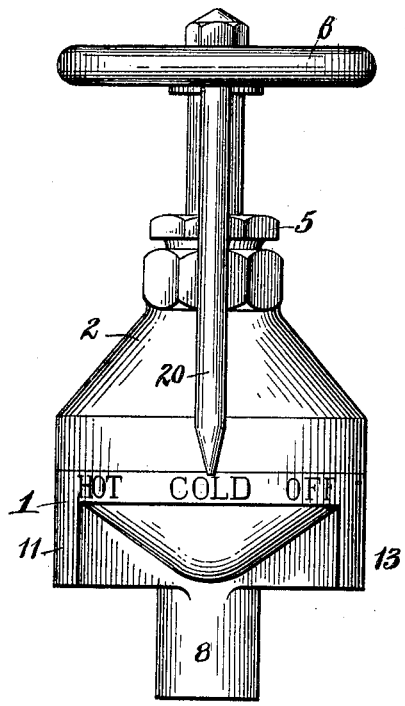
Figure 2:
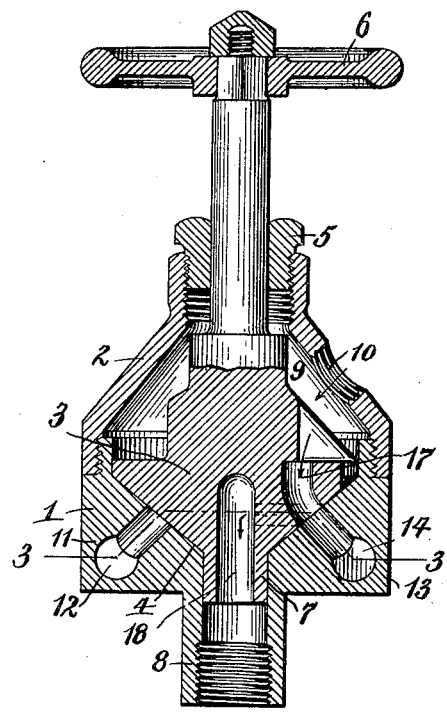
Figure 4:
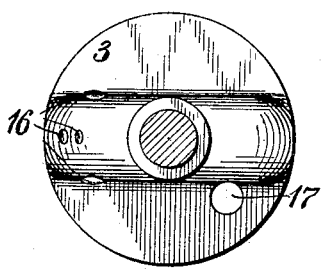
Figure 3:
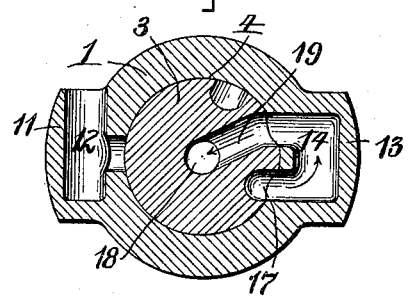

In the accompanying drawings: Figure 1 is a side elevation of the valve. Fig. 2 is a vertical section thereof, adjusted to deliver cold water. Fig. 3 is a horizontal section on line 3—3, Fig. 2. Fig. 4 is a sectional top plan view of the valve head. Fig. 5 is a vertical section of the valve adjusted to deliver hot water. Fig. 6 is a horizontal section on line 6—6, Fig. 5. Fig. 7 is a vertical section of the valve adjusted to deliver steam only. Fig. 8 is a horizontal section on line 8—8, Fig. 7.

Similar characters of reference indicate corresponding parts throughout the several views.

The case of the valve preferably comprises a cylindrical lower section 1 and a conical upper section 2 united by a screw threaded joint.

3 indicates the rotary valve disk or head preferably having its face tapered downwardly in the form of an inverted cone and bearing against a corresponding seat 4 in the lower portion of the case. The spindle of the valve extends through a stuffing gland or box 5 in the top of the case and terminates in a hand wheel 6 or other suitable handle for turning it. At its lower end the valve may be provided with an axial stem 7 which turns in a bearing formed by an outlet or discharge connection 8 arranged centrally in the bottom of the case.

The top of the valve is separated from the wall of the upper section 2 by an intervening cold water chamber 9 having an inlet 10. The case is provided at one side with a steam inlet or connection 11 having an inwardly extending port 12 which terminates at the valve seat 4. At another side, preferably diametrically opposite the steam inlet, the case has an enlargement 13 containing a double-ended or substantially U-shaped port 14 both ends of which terminate at the valve seat 4, as shown in Figs. 3, 6 and 8.

The valve is provided with an injecting and mixing port 15 extending from one side of its face to the other and adapted to register at its ends with the steam inlet port 12 and one end or branch of the U-shaped port 14, as shown in Figs. 5 and 6. The valve also has one or more main cold water passages 16 which connect the water inlet chamber 9 with the inlet side of the injecting port 15; a supplemental cold water inlet port 17, extending from the top to the face of the valve and adapted to register with one end of said U-shaped port, as shown in Figs. 2 and 3, and an outlet port 18, extending upwardly through the lower valve stem 7 into the body of the valve and having a lateral branch 19 extending to the face of the valve and adapted to register with the steam inlet port 12, as shown in Figs. 7 and 8, or with one or the other end of said U-shaped port, as shown by full lines in Fig. 3 and by dotted lines in Fig. 6. Preferably the injecting port 15 is of inverted V-form, the same extending upwardly from one side of the valve face over the top of the outlet port 18 and thence downwardly to the opposite side of said face.

As shown in Fig. 1, a pointer or indicator 20 movable with the valve coöperates with appropriate marks or designations on the outer side of the case corresponding to the several positions of the valve, such as "Off"; "Hot"; "Off"; "Cold" and "Steam" (the first and last not shown). In the preferred construction illustrated in the drawings, this pointer extends downwardly from the hand wheel 6.

In the use of the valve, when the same is to deliver cold water only, it is turned to bring the pointer opposite the corresponding indication. In this adjustment of the valve, which is shown in Figs. 2 and 3, the incoming cold water passes through the cold water valve-port 17, into the U-shaped port 14 and from the latter through the outlet port 18 and the discharge connection 8 of the valve case, communication between the steam inlet 11 and injecting port 15 and the discharge connection being cut off.

When it is desired to deliver steam only, the valve is turned to the position shown in Figs. 7 and 8, whereupon steam passes from the inlet 11 directly through the port 12, branch 19 and outlet port 18, into the discharge connection, all communication between the latter and the other ports being cut off.

To deliver hot water, the valve is turned to bring the pointer opposite the corresponding indication. In this adjustment of the valve, which is shown in Figs. 5 and 6, steam passes through the port 12, injecting port 15, U-shaped port 14, branch 19, outlet port 18 and the discharge connection, producing an injecting action by which the cold water in the inlet chamber 9 is drawn through the passages 16 into said injecting port, thus commingling the water with the steam and highly heating it. In order to effect a better mixture of the water and steam, a plurality of such water inlet passages 16 are preferably employed, as shown in Figs. 4 and 5, whereby the water is broken up into numerous small streams. By this injecting action of the valve, the disagreeable and destructive chatter or vibration of the valve and the pipes connected therewith is effectually prevented, avoiding the leakage incident to the ordinary valves heretofore in use.

The valve is very convenient and is especially serviceable for slaughtering houses. After filling a tank or boiler with hot water, the operator by turning the pointer to the "Steam" indication, can keep the water at the required temperature, and if it should become too hot he can readily reduce the temperature by turning the valve to the "Cold" indication.

The double ended port 14 is an important feature of the valve, as it forms a double seal when the valve is closed or wholly turned off. When in this position, the steam or water in order to escape into the discharge connection 8 must pass from a port in the valve head into one end of said port 14 and out of its other end back into the valve head, thus providing a tight and reliable duplex seal between the valve case and the valve head.

As shown, the area of the steam inlet port 12 is small compared with that of the back of the valve head, enabling the water pressure against the said back to overcome the steam pressure against the face of the valve and preventing steam from leaking past the valve. By this construction, the valve is held against its seat by the water-pressure, doing away with a spring for this purpose.

The conical shape of the face of the rotary valve and its seat renders these parts self grinding, thus maintaining a tight joint between them.

I claim as my invention:

1. A mixing valve, comprising a case having a valve-seat, an outlet, a plurality of inlets for different fluids and a double-ended port beginning and terminating at said valve seat, and a valve-head arranged in said seat and having a port arranged to connect one of said inlets with one end of said double-ended port and an outlet-port arranged to connect with the other end of said double-ended port, said double-ended port being closed except at its ends.

2. A mixing valve, comprising a case having a valve-seat, an outlet, a plurality of inlets for different fluids and a double-ended port beginning and terminating at said valve seat, and a valve-head arranged in said seat and having an injecting port arranged to connect one of said inlets with one end of said double-ended port, a passage connecting the other inlet of the valve case with said injecting port, and an outlet port arranged to connect with the other end of said double-ended port, said double-ended port being closed except at its ends.

3. A mixing valve comprising a case having a valve seat, an outlet, a cold water inlet, a steam inlet, and a double-ended port beginning and ending at said valve seat, and a valve head arranged in said seat and having an injecting port arranged to connect said steam inlet with one end of said double-ended port, a passage connecting the cold water inlet with said injecting port, an outlet port arranged to register with either end of said double-ended port, and a cold water port extending from the back to the face of the valve-head and arranged to register with one end of said double-ended port, said double-ended port being closed except at its ends.

4. A mixing valve, comprising a case having a valve-seat, an outlet, a cold water inlet, a steam inlet and a double-ended port beginning and ending at said valve-seat, and a valve head arranged in said seat and having an axial outlet port extending inwardly from the front side of the valve head and arranged to register with said steam inlet or said double-ended port, an injecting port of inverted V-form extending around the inner end of said outlet port and arranged to connect said steam inlet with one end of said double-ended port, a passage connecting said cold water inlet with said injecting port, and a cold water port arranged to connect said cold water inlet with one end of said double-ended port.

5. A mixing valve, comprising a valve-case having a valve-seat, an outlet, a water-inlet chamber and a steam inlet terminating at said valve-seat, and a valve-head arranged in said seat and having an injecting port arranged to connect said steam inlet with the outlet of the valve case and a plurality of passages connecting the water inlet chamber with said injecting port, said water inlet chamber being located at the back of the valve-head and said steam inlet being of small area relative to the back of the valve-head.

Witness my hand this 4th day of June, 1913.

JOHN SCHULTZ.

Witnesses:
C. F. GEYER,
E. M. GRAHAM.

Copies of this patent may be obtained for five cents each, by addressing the "Commissioner of Patents, Washington, D. C."